Jan. 24, 1956
H. JUNGHANS ET AL  2,731,790
ENERGY EQUALIZING SYSTEM FOR SPRING OPERATED MECHANISMS
Filed July 5, 1951
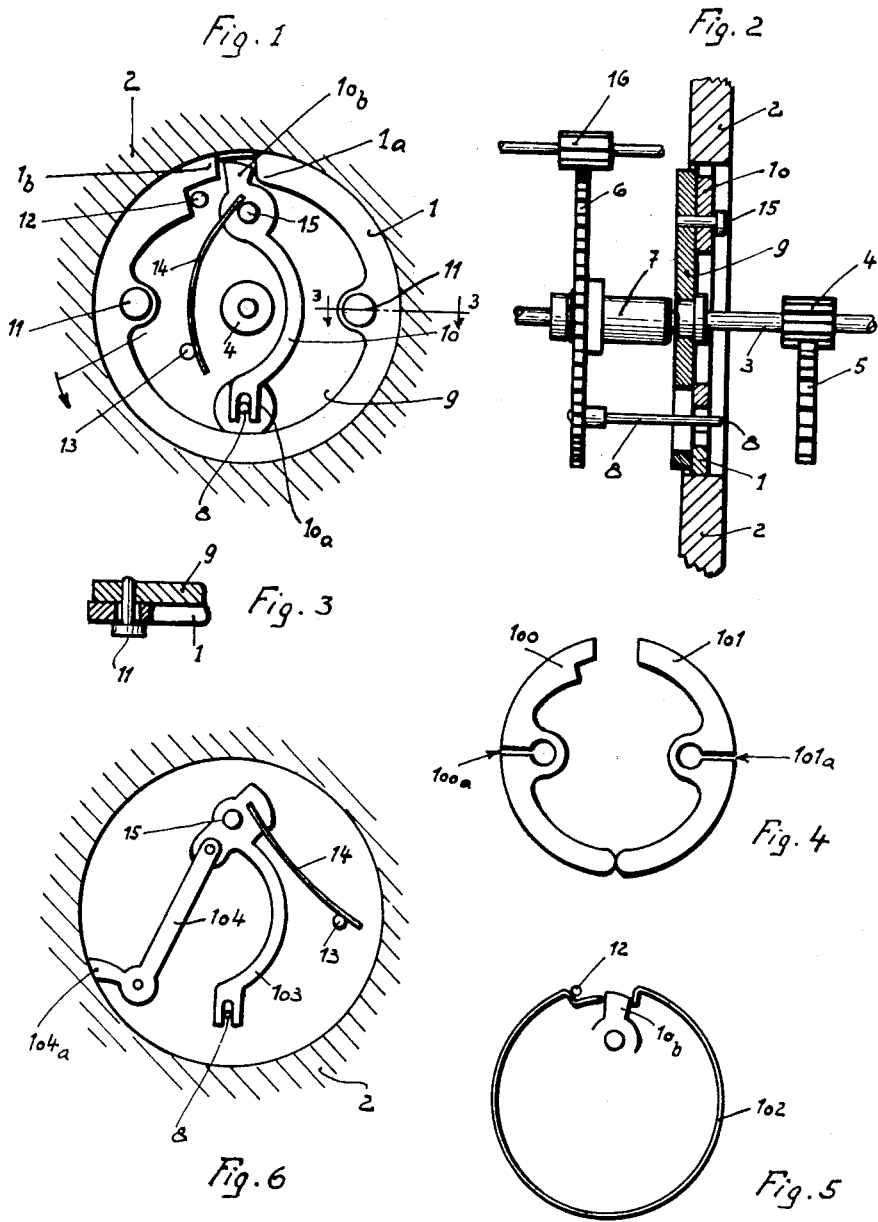
Inventors
Helmut Junghans +
Leo Hartner
By
Young, Emery + Thompson
Attys.

United States Patent Office 2,731,790
Patented Jan. 24, 1956

2,731,790

ENERGY EQUALIZING SYSTEM FOR SPRING OPERATED MECHANISMS

Helmut Junghans, Schramberg-Sulgen, and Leo Hartner, Schramberg, Germany, assignors to Gebruder Junghans A. G., Schramberg/Schwarzwald, Germany Application July 5, 1951, Serial No. 235,351

3 Claims. (Cl. 58—48)

This invention relates to energy equalizing systems for spring operated mechanisms, especially of timepieces, in which the excess torque is dissipated by friction.

The invention consists in providing energy dissipating means in the form of a ring brake with the use of suitable gear transformation, which means is found to operate extremely efficiently, yet with great sensitivity of response.

Further objects will be apparent from the following description when considered in connection with the accompanying drawing in which, Figure 1 is an elevation of the mechanism according to one embodiment; Fig. 2 is a sectional end elevation; Fig. 3 is a sectional view of a detail; and Figs. 4 to 6 are side views showing other embodiments.

The shaft 3 has a pinion gear 4 thereon engaging a gear 5 of the power spring, not shown, and a carrier disc 9 is secured on the shaft 3. This disc 9 has a transmission lever 10 pivoted on a pin 15 thereon, and it also carries the brake ring 1 secured to the carrier disc by rivets 11 passing through holes in the brake ring which are larger than the rivets, as shown in Fig. 3, so that they have sufficient play in the holes to allow the brake ring to apply itself snugly against the circumference of the brake housing 2. A gear 6 with boss 7 is in mesh with an escape wheel pinion 16 and is loosely mounted on shaft 3. The gear 6 is coupled to the transmission lever 10 by means of a pin 8 engaging a slot 10a in the lever 10. Owing to the drive effort of the power spring, the carrier disc 9 is rotated in the direction of the arrow, Figure 1.

Assuming that the escapement is stopped, then the gear 6 and the pin 8 do not turn, but the carrier disc 9 turns in the direction of the arrow, as indicated, whereby a spring 14 is tensioned against a stop pin 13 and a lug 10b at the end of the transmission lever 10 comes into contact with a corner 1a of the brake ring 1, when a certain spring tension is produced. A shoulder at the opposite end 1b of the brake ring 1 thereby is forced against a stop pin 12. A slight pressure against the parts 1a and 1b of the brake ring 1 brings the carrier disc to rest, in view of the large braking area. This braking action, however, would not suffice, if for example, the pin 8 were to act directly on the corner 1a of the brake ring 1. For this reason, the transmission lever 10 with large mechanical advantage is inserted. As soon as the escape wheel is freed, and the gear 6 with pin 8 starts to turn, that is, after the smallest angular movement, the brake ring 1 is detensioned and the carrier disc 9 resumes its rotation. It should be noted that the gear 6 rotates in the same direction as the shaft 3 on running down. The torque passed through to the gear 6 is determined by the tension of spring 14 against the pin 13, that is, the brake operates at a definitely pre-determined spring adjustment.

Fig. 4 shows a modification of the brake ring, which is shown divided into semi-circular brake shoes 100 and 101 which may have slots 100a and 101a, formed therein, to provide better contact of the shoes against the circumference of the brake housing 2.

Fig. 5 shows another modification of the brake ring, designated 102, in which the ring is made of spring steel strip with ends formed for cooperation with a stop pin 12 and the transmission lever lug 10b as in the case of the divided brake shoes and Fig. 1.

Fig. 6 shows yet another modification in which for the brake ring or brake shoes there is substituted a further transmission lever 104 having a braking surface 104a, which slides on the circumference of the brake housing 2. The spring 14 is tensioned against a post 13 as in the case shown in Fig. 1, which arrangement is common to all the modifications shown.

The constructions according to Figs. 1, 4 and 5 with brake rings have the advantage that slight imperfection of centering of the shaft 3 with respect to the circumference of the brake housing 2 has no influence on the transmitted torque. This is due to the fact that the distance between the stop pin 12 and the contact corner 1a of the ring 1 remains constant irrespective of said centering. Since the brake ring has sufficient play relatively to the rivets 11, the circumference of the brake housing can adapt itself to any out-of-centering that may exist, owing to the anchoring of the ring between the top pin 12 and the lug 10a of the lever 10.

Further modifications are possible limited only by the appended claims.

We claim:

1. Power equalizing system for spring operated mechanisms comprising a stationary housing having a circular opening therein, a brake means in the form of a ring provided in the circular opening, said brake ring having a cut-out portion therein so that the ring brake is non-continuous, an abutting shoulder provided on the end of the brake ring near said cut-out portion, a shaft coaxial to the circular opening and passing therethrough and being connected with the spring of the spring operated mechanism, a carrier disc having an abutment engaging said abutting shoulder mounted to rotate with and on the shaft and freely rotatable in the circular opening of the housing, means to secure the ring brake on one side of the disc with movement in a radial direction, a double armed lever of which one arm is much longer than the other arm, said lever being pivotally mounted on the carrier disc on the same side thereof as the brake ring and having its shorter arm projecting into the cut-out portion of the brake ring and engaging the other end of the brake ring, the breadth of the cut-out portion being only slightly greater than the breadth of the shorter arm of the lever, a second abutment on the disc, a spring having one end in tensioned engagement with the shorter arm of the lever and the other end tensioned against said second abutment, a gear loosely rotatable on the shaft and in operative engagement with the spring operated mechanism through the last-mentioned spring, a pin mounted in the gear, and means for coupling the pin with the longer arm of the lever, said last-mentioned spring being periodically tensioned by the spring operated mechanism, upon a predetermined movement of the gear and pin relative to the disc, with the brake ring and the housing being braked relative to each other until the spring has given up its energy to the gear.

2. Power equalizing system according to claim 1, in which the brake ring is formed of a plurality of parts in the form of segments.

3. Power equalizing system according to claim 1, in which the brake ring is formed of two segments each having centrally a weakened cross-section.

References Cited in the file of this patent

FOREIGN PATENTS

| 381,868 | France | Nov. 23, 1907 |
| 140,468 | Switzerland | Aug. 16, 1930 |